(12) United States Patent
Polkus et al.

(10) Patent No.: US 6,402,373 B1
(45) Date of Patent: Jun. 11, 2002

(54) METHOD AND SYSTEM FOR DETERMINING A SOURCE-TO-IMAGE DISTANCE IN A DIGITAL IMAGING SYSTEM

(75) Inventors: Vincent S. Polkus, Delafield; Jon C. Omernick, Wauwatosa; Jonathan C. Boomgaarden, Waukesha; Robert M. Stetz, Oconomowoc, all of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/597,115

(22) Filed: Jun. 20, 2000

(51) Int. Cl.[7] .............................................. G01D 18/00

(52) U.S. Cl. ...................................... 378/207

(58) Field of Search ......................... 378/207

Primary Examiner—Craig E. Church
(74) Attorney, Agent, or Firm—Fletcher, Yoder & Van Someren

(57) ABSTRACT

A method is provided for determining source-to-image distance (SID) setpoints in a digital radiographic imaging system. SID setpoints are determined during a setup and calibration procedure which includes generating x-ray beams while varying certain system parameters, such as the x-ray source position or the size of the collimator opening, and detecting and determining the size of the x-ray beams that impact on the digital detector. SID values and a separation gain constant can then be determined based on the calculated sizes of the detected x-ray beams and the feedback signals which are representative of the various system parameters that were varied (e.g., source position, collimator blade position, etc.) during the setup and calibration procedure. The separation gain constant and the calculated, empirical SID values can then be used to position the x-ray source at any user-selected SID based on position sensor feedback signals. The procedure also provides for a calibrated readout of the actual SID, which can be displayed to a user of the imaging system.

34 Claims, 7 Drawing Sheets

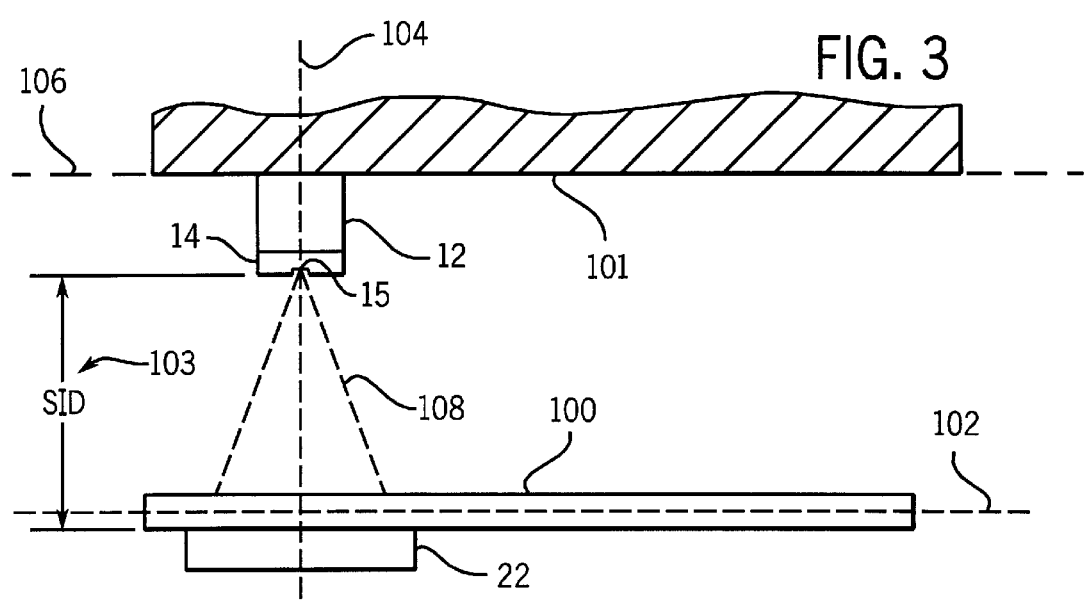

METHOD AND SYSTEM FOR DETERMINING A SOURCE-TO-IMAGE DISTANCE IN A DIGITAL IMAGING SYSTEM

FIELD OF THE INVENTION

The present invention relates generally to digital imaging systems and, more particularly, to a calibration and setup procedure for determining a separation distance between a radiation source and a digital detector in a digital imaging system.

BACKGROUND OF THE INVENTION

The installation and setup procedures for digital imaging systems, such as radiographic diagnostic imaging systems, can be complex and time-consuming. For example, to comply with customer image quality and consistency requirements and various regulatory and safety standards for diagnostic imaging systems, such procedures generally require the determination of a variety of factors, including the accurate positioning of the x-ray source with respect to the x-ray detector. For instance, the determination and establishment of fixed setpoints (or detent positions) for setting the separation distance between the x-ray source and x-ray detector and calibrating the system such that an accurate readout of the separation distance can be obtained often are required procedures. The determination and establishment of this separation distance, referred to as the source-to-image distance (SID), assists in appropriately controlling the size of the x-ray field during diagnostic use of the imaging system. Further, many regulatory requirements specify that the SID must be clearly displayed to the operator or user of the system with a certain level of accuracy.

Generally, known installation and calibration procedures for establishing fixed SID setpoints and corresponding SID readouts require the presence of a field engineer who, through a trial and error process, calibrates the radiographic imaging system and installs fixed, preset detent positions that lock the x-ray source into various repeatable separation distances from the detector. For example, the field engineer may install an electromechanical switch, or other device, in the ceiling or the superstructure of the x-ray source that indicates to the user in a tactile or otherwise perceptible manner that the x-ray source is at one of the preset SID positions. Many radiographic imaging systems include industry-standard SID setpoints at separation distances of, for example, 40 inches, 60 inches, and 72 inches.

The installation and calibration procedure, however, becomes even more complex if the detector also is non-stationary. In such event, the field engineer must repeat the setup and calibration procedure at multiple detector positions and install several setpoint or detent devices at the corresponding multiple determined SID positions.

Once the preset SID positions are determined and marked with a detent device, the SID positions are fixed. Thus, a user of the imaging system is not afforded flexibility in the event that the user may desire an SID position that is non-standard. Accordingly, even though either the x-ray source or the x-ray detector could be moved to a variety of different positions such that patients of various sizes could be accommodated or various anatomical parts could be more easily imaged, the actual positions in which the x-ray source could be located with respect to the x-ray detector are restricted to only those few positions which have corresponding fixed detent setpoints.

Preset fixed setpoints can also result in decreased system reliability because the physical switches or detent devices increase the number of components which can potentially fail during system usage.

Thus, it would be desirable to provide a system and method for installing and calibrating a digital radiographic imaging system that would avoid time-consuming iterative procedures for determining fixed SID positions and for providing a calibrated readout and display of the actual SID. It would be further desirable if such a system and method would result in the elimination of, or reduced reliance on, fixed setpoints and physical fixed setpoint devices, thus affording greater flexibility and increasing the reliability of the system.

SUMMARY OF THE INVENTION

The present invention addresses one or more of the shortcomings noted above.

For example, a method for determining a separation distance between a radiation source and a digital detector comprises the steps of detecting a first impact region on the detector of a first radiation beam generated by the source while at a first source position, determining a first size of the first impact region, and varying a size of a collimator opening through which radiation beams generated by the source are directed. A second impact region on the detector of a second radiation beam is then detected, the second radiation beam being generated by the source while at the first source position and being directed through the varied size of the collimator opening such that the second impact region has a second size different than the first size. The second size is determined, and the separation distance is determined based on the variation of the size of the collimator opening and the determined first and second sizes of the first and second impact regions.

A digital imaging system is also provided which includes a digital detector configured to detect radiation beams, a radiation source to generate radiation beams, and a processing module. The source includes a collimator having a collimator opening through which the radiation beams are directed. The radiation source is configured to generate a first radiation beam detectable by the detector while the source is at a first source position and while the collimator opening is at a first size. The radiation source is also configured to generate a second radiation beam detectable by the detector while the source is at the first source position and while the collimator opening is at a second size. The processing module is configured to determine the first size of the first impact region of the first radiation beam detected by the detector and the second size of the second impact region of the second radiation beam detected by the detector. The processing module is further configured to determine a separation distance corresponding to the first source position based on the first and second sizes of the collimator opening and the first and second sizes of the impact regions.

BRIEF DESCRIPTION OF THE DRAWINGS

FIG. 3 is a side view of certain of the image acquisition components of the system of FIG. 1, and, in particular, illustrates the orientation of an x-ray source with respect to a digital x-ray detector associated with a patient positioner;

DETAILED DESCRIPTION OF THE INVENTION

The following detailed description is made with reference to a digital radiographic imaging system having an x-ray source and a digital detector configured to detect x-ray beams generated by the source. It should be understood, however, that the system and method described hereafter can be implemented in other types of digital imaging systems which have a source that generates radiation other than in the x-ray spectrum (e.g., visible light, infrared, etc.). In such imaging systems, an appropriate digital detector is provided which is configured to detect the particular type of radiation generated by the radiation source.

Figure 1:
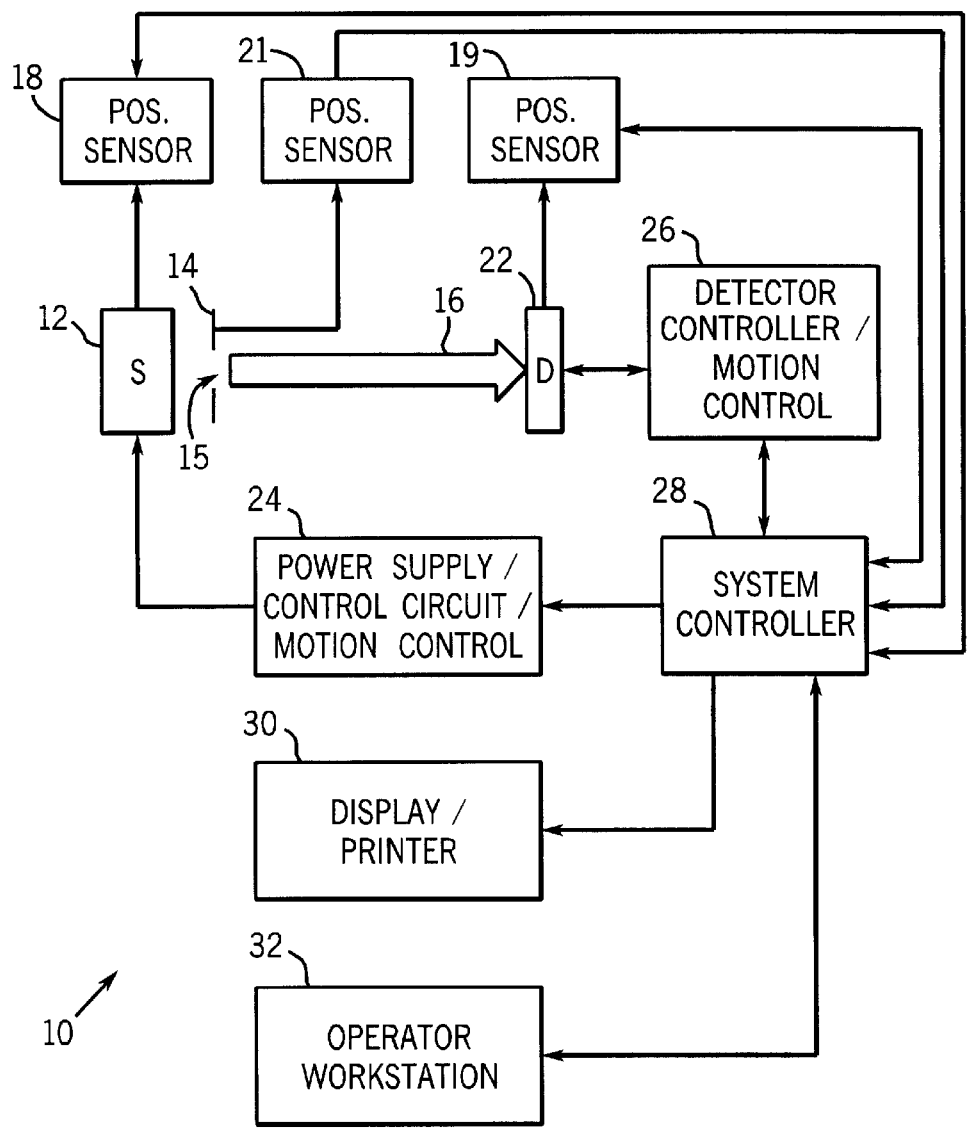
FIG. 1 is a diagrammatical overview of a digital x-ray imaging system in which the present technique is incorporated.

Turning now to the figures, FIG. 1 illustrates diagrammatically an imaging system 10 for acquiring and processing discrete pixel image data. In the illustrated embodiment, system 10 is a digital x-ray system that facilitates installation and calibration procedures such that accurate image data can subsequently be acquired and processed by system 10 for output and display. In the embodiment illustrated in FIG. 1, imaging system 10 includes a source of x-ray radiation 12 having a collimator assembly 14. Source 12 is configured to generate an x-ray beam, referenced generally by the numeral 16, that passes through an opening 15 in collimator assembly 14. Opening 15 in collimator 14 is adjustable (e.g., by adjusting the position of one or more sets of collimator blades) such that the size (i.e., the beam angle) of x-ray beam 16 may be varied. For example, collimator 14 may include a first set of collimator blades 17 that are movable such that the lateral dimension of opening 15 may be varied. Collimator 14 may further include a second set of collimator blades 19 that can be variably positioned to change the size of opening 15 in the longitudinal direction. In some embodiments, collimator 14 may further include a third set of collimator blades (not shown) which are configured such that opening 14 has a circular shape.

Collimator 14 is constructed such that the locations of blade sets 17 and 19 within the assembly are tightly controlled and known. Thus, for example, the distance, $O_1$, of blade set 17 from the focal point of the x-ray source 12 may be established with a high degree of accuracy. Similarly, the distance, $O_2$, of blade set 19 from the focal point of x-ray source 12 also may be established with a high degree of accuracy. Distances $O_1$ and $O_2$ thus may be provided to a system controller (e.g., controller 28 illustrated in FIG. 2) for use in determining certain system parameters during the setup and calibration procedure which will be described below. Alternatively, the distance, )O, between blade set 17 and blade set 19 may be known and provided to the system controller in lieu of the individual distances $O_1$ and $O_2$.

After passing through opening 15 in collimator assembly 14, x-ray beam 16 impacts upon and is detected by a digital x-ray detector 22. Detector 22 converts the x-ray photons received on its surface to lower energy photons, and subsequently to electrical signals which are acquired and processed to reconstruct an image.

In an exemplary embodiment, system 10 is located in an examination room. The examination room may include, for example, a horizontal patient positioner or table for positioning a subject, such as a patient, to be imaged. The horizontal table or positioner may include a track disposed along a translational axis (e.g. the longitudinal axis) of the table for moving a detector 22 from one end of the table to another. Movement of detector 22 adds flexibility to system 10, because a movable detector allows various anatomical parts of a subject to be imaged without requiring repositioning of the subject and more easily accommodates patients of various sizes.

The examination room may also include an upright, or vertical, positioner against which a subject, such as a patient, may be positioned. Such an upright positioner may include a track disposed along a translational axis of the positioner such that a detector 22 may be moved between upper and lower vertical positions. Again, such movement advantageously allows accommodation of subjects of different sizes and/or facilitates imaging of different anatomical targets.

In an exemplary embodiment, the examination room includes an x-ray source 12 which is movable in longitudinal, lateral, and vertical directions (as well as about two angular degrees of freedom), such that the source can be positioned to generate an x-ray field that may be detected by a detector 22 associated with a horizontal patient positioner or a detector 22 associated with a vertical positioner. For example, the source 12 may be movable in the longitudinal direction along a track mounted to the ceiling of the examination room or the superstructure which supports the source 12. The track generally is positioned such that it is substantially parallel to the track of the horizontal patient positioner along which the detector 22 may be moved. The source 12 may also be movable both laterally and vertically with respect to the longitudinal direction. Further, the source may be arranged to angularly rotate such that the same source may be used in conjunction with either a detector 22 associated with a horizontal positioner or a detector 22 associated with an upright positioner. Accordingly, the mobility of source 12 allows source 12 to be located at any number of positions such that an x-ray beam generated by source 12 can be centered with respect to detector 22 and such that the separation distance between source 12 and detector 22 (i.e., the SID) can be varied.

In the embodiment illustrated in FIG. 1, imaging system 10 further includes a source position transducer 18 to sense and provide an electrical signal representative of the position of the source 12 in the longitudinal, lateral, and/or vertical directions. System 10 further includes a detector position transducer 19 to sense and provide an electrical signal representative of the position of the detector 22 with respect to the translational axis of the horizontal positioner or of the upright positioner. Exemplary position transducers 18 and 19 are continuous position sensors, such as potentiometers, optical encoders, etc. Further, system 10 may include a position sensing transducer 21 to sense the size, or a change in the size, of opening 15 of collimator assembly 14. In an exemplary embodiment, such a position sensing transducer 21, which typically is provided in conventional collimator assemblies, may include transducers 21a and 21b to sense the size of opening 15 by sensing the position of movable collimator blade sets 17 and 19.

Source 12 is controlled by a power supply/control circuit 24 which provides both power and control signals for installation and setup procedures, as well as for examination sequences. In an exemplary embodiment, control circuit 24 may further include positioning or motion control elements, such as motor drive circuitry and a motor, to position the source 12 along any of the longitudinal, lateral, and vertical axes. As further illustrated in FIG. 1, detector 22 is coupled to a detector controller 26, which commands acquisition of the imaging signals generated in the detector. Detector controller 26 may also execute various signal processing and filtration functions, such as for initial adjustment of dynamic ranges, interleaving of digital image data, and so forth. Detector controller 26 may also include positioning or motion control elements, such as motor drive circuitry and a motor, for positioning the detector 22 along the translational axis of the patient positioner.

Both power supply/control circuit 24 and detector controller 26 are responsive to signals from a system controller 28. In general, system controller 28 commands operation of the imaging system to execute installation and calibration procedures, including generation of command signals to control movement and positioning of source 12 and detector 22 and processing of received data and signals to determine system calibration and gain factors. System controller 28 also commands operation of the imaging system to execute examination protocols and to process acquired image data. In the present context, system controller 28 includes signal processing circuitry, typically based upon a general purpose or application-specific digital computer, associated memory circuitry for storing programs and routines executed by the computer, as well as configuration parameters and image data, interface circuits, and so forth. In the embodiment illustrated in FIG. 1, system controller 28 (or other appropriate processing module), in accordance with a stored setup program, receives feedback signals from position transducers 18, 19, and 21, and image data from detector controller 26, and processes the signals and data to determine SIDs and SID setpoints for positioning source 12 with respect to detector 22 and for providing a calibrated readout of the actual SID, as will be explained in detail below.

In the embodiment illustrated in FIG. 1, system controller 28 is also linked to at least one output device, such as a display or printer, as indicated at reference numeral 30. The output device may include standard or special purpose computer monitors and associated processing circuitry. One or more operator workstations 32, or other user interfaces, may be further linked in the system for outputting system parameters, controlling installation and setup procedures, requesting and controlling the setup of examinations, viewing images, and so forth. In general, displays, printers, workstations, and similar devices supplied within the system may be local to the data acquisition components, such as located physically within the examination room, or may be remote from these components, such as elsewhere within an institution or hospital, or in an entirely different location that is linked to the image acquisition system via one or more configurable networks, such as the Internet, a virtual private network, and so forth.

Figure 2:
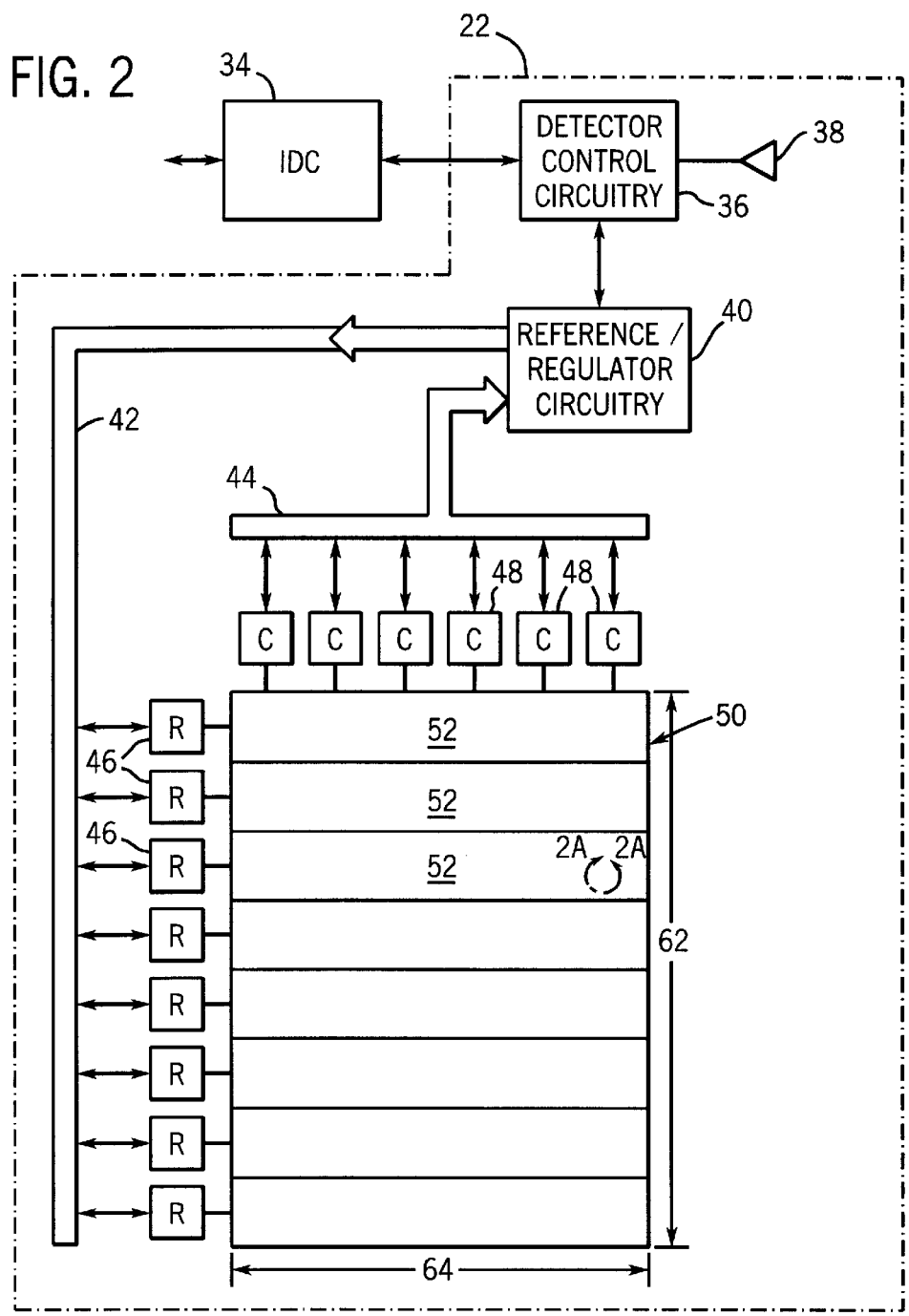
FIG. 2 is a diagrammatical representation of certain of the functional circuitry for producing image data in a detector of the system of FIG. 1.

FIG. 2 is a diagrammatical representation of functional components of an exemplary digital detector 22. FIG. 2 also represents an imaging detector controller or IDC 34 which will typically be configured within detector controller 26. IDC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column drivers used to transmit signals during data acquisition phases of operation of the system. Circuitry 36 therefore transmits power and control signals to reference/regulator circuitry 40 and receives digital image pixel data from circuitry 40.

In the exemplary embodiment illustrated, detector 22 includes a scintillator that converts x-ray photons received on the detector surface during examinations to lower energy (light) photons. An array of photodetectors then converts the light photons to electrical signals which are representative of the number of photons or the intensity of radiation impacting individual pixel regions of the detector surface. Readout electronics convert the resulting analog signals to digital values that can be processed, stored, and displayed, such as in a display 30 or a workstation 32, following reconstruction of the image. In a present form, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics. The drains of the transistors in a column are connected together and an electrode of each column is connected to readout electronics.

In the embodiment illustrated in FIG. 2, by way of example, a row bus 42 includes a plurality of conductors for enabling readout from various columns of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

Figure 2A:
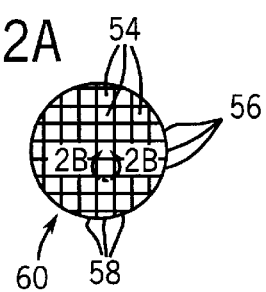
FIG. 2A is an enlarged view of a section of a defector panel, as indicated by line 2A–2A of FIG. 2.

In the illustrated embodiment, row drivers 46 and readout electronics 48 are coupled to a detector panel 50 which may be subdivided into a plurality of sections 52. Each section 52 is coupled to one of the row drivers 46 and includes a number of rows. Similarly, each column driver 48 is coupled to a series of columns. As illustrated in FIG. 2A, the photodiode and thin film transistor arrangement mentioned above thereby define a series of pixels or discrete picture elements 54 which are arranged in rows 56 and columns 58. The rows and columns define an image matrix 60, having a known height 62, a known width 64, and a known number of rows and columns.

Figure 2B:
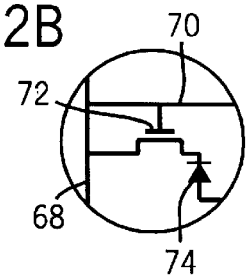
FIG. 2B is an enlarged view of a portion of FIG. 2A, as indicated by line 2B–2B of FIG. 2A.

As illustrated in FIG. 2B, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode may be accessed via readout electronics 48, and converted to digital signals for subsequent processing and image reconstruction.

Before imaging system 10 may be used to perform examination sequences, system 10 is properly installed and calibrated to ensure compliance with customer needs, performance requirements, and various regulatory standards. A performance variable established during the setup and calibration process is the SID accuracy of the system 10. The setup of SID involves both the establishment of SID setpoints and the provision of an accurate calibrated readout that is visible to the user and which is representative of the actual physical measurement of the SID. Accurate establishment and calculation of the SID assists in appropriate control of the size of the x-ray field generated during diagnostic use of system 10.

Exemplary techniques for establishing SID setpoints and providing a calibrated SID readout may be understood with reference to FIGS. 3–7. Turning first to FIG. 3, radiation source 12 is shown movably mounted to a support structure 101 and positioned with respect to detector 22, which is associated with a patient positioner 100. The distance between source 12 and detector 22, i.e. the SID, is referenced generally by the numeral 103. Although the positioner 100 is illustrated in a horizontal orientation, it should be understood that positioner 100 may be either a horizontal positioner, such as a patient table, or an upright positioner. In the exemplary embodiment illustrated in FIG. 3, detector 22 is movable along a detector translational axis 102 and source 12 is movable along source-to-detector axis 104 and source translational axis 106. As further illustrated in FIG. 3, source 12 generates an x-ray beam 108 which impacts upon and is detected by detector 22. The size of beam 108 is determined by the size of opening 15 in collimator assembly 14.

Figure 4:
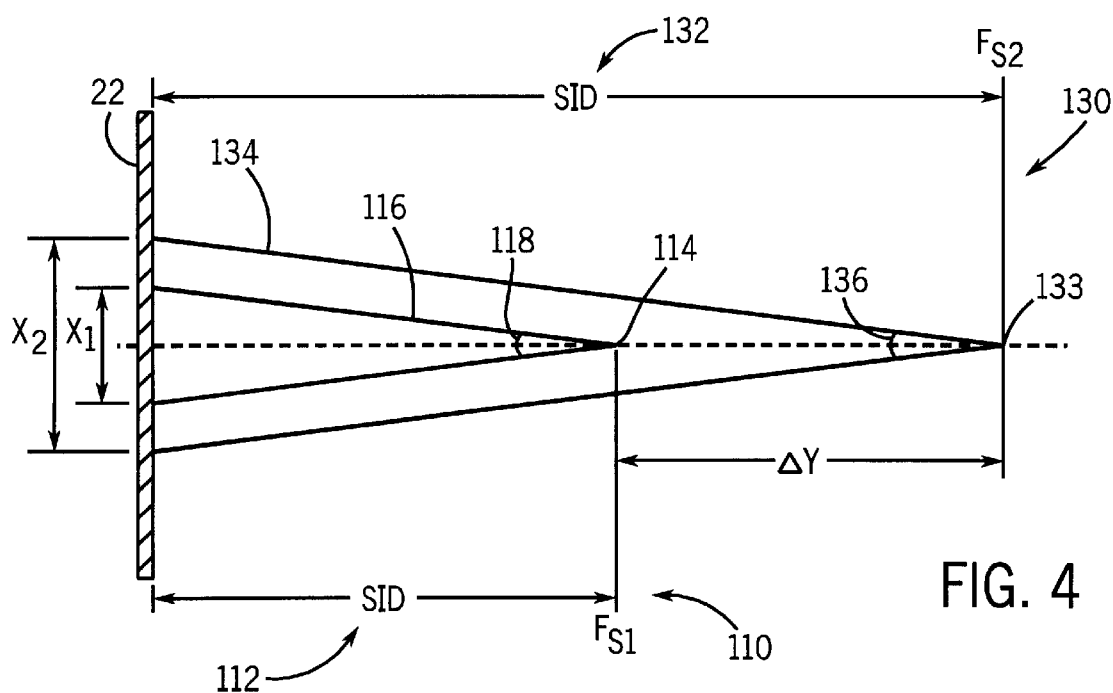
FIG. 4 illustrates an exemplary setup and calibration technique for the digital x-ray imaging system of FIG. 1, in which the x-ray source generates an x-ray beam having a fixed angle while the source is at two different separation distances from the detector.

Turning now to FIG. 4, an exemplary technique for establishing SID setpoints for system 10 is illustrated. It should be understood that, although detector 22 is shown in an upright position, the exemplary technique which will be described can also be used with detectors associated with horizontal positioners. The technique illustrated in FIG. 4 involves generating an x-ray beam having a fixed beam angle at two different source positions and detection of the respective x-ray beams at the detector.

As illustrated, source 12 is positioned at a first source position 110 which corresponds to a first SID, which is referenced generally by the numeral 112. Thus, the source-to-image distance 112 is the distance between the detector 22 and focal spot 114 of an x-ray beam 116 generated by source 12 while at the first source position 110. Further, when source 12 is at first source position 110, source position transducer 18 provides a feedback signal, $F_{S1}$, which corresponds to the first source position 110.

Figure 4A:
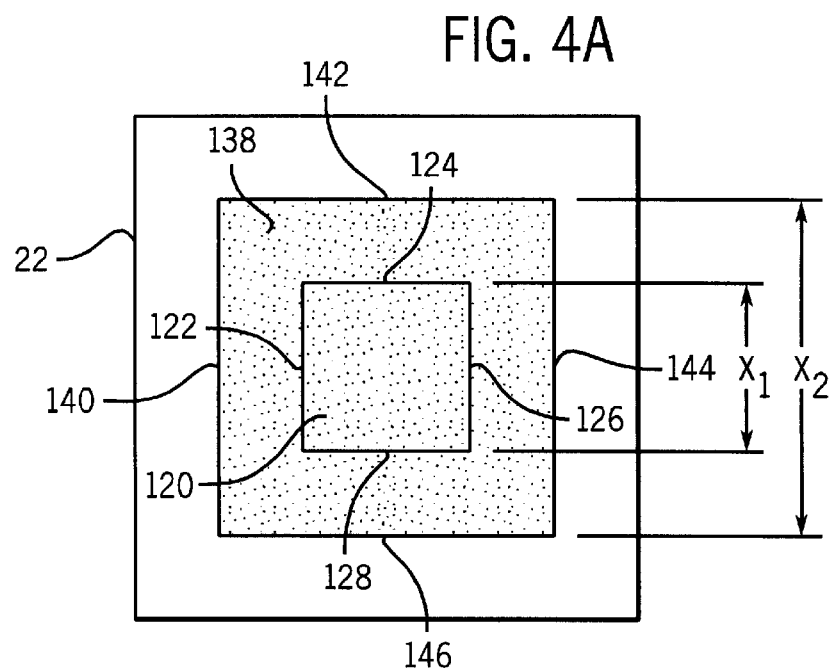
FIG. 4A illustrates the impact regions on the detector of two different x-ray beams, each having the same beam angle, that were generated while the x-ray source was at two different separation distances from the detector, as illustrated in FIG. 4.

As further illustrated in FIG. 4, x-ray beam 116 has a beam angle 118 which is determined by the size of the opening 15 of collimator assembly 14. X-ray beam 116 impacts detector 22 at an impact region 120, which is illustrated in FIG. 4A. Impact region 120 is defined by peripheral edges 122, 124, 126, and 128. Although impact region 120 is illustrated as having a rectangular or square shape, it should be understood that the peripheral edges 122–128 may be curved such that the periphery of impact region 120 is circular or otherwise curvilinear. Detector 22 detects the impact of x-ray beam 116 and generates electrical signals representative of the detected x-ray beam 116. Based on these electrical signals, the size of impact region 120 may be determined by detector controller 26 and system controller 28 in accordance with appropriate algorithms. In an exemplary embodiment, the size of impact region 120 is represented by detecting opposing peripheral edges, e.g., edges 124 and 128, and then determining the distance between the opposing peripheral edges. For example, an algorithm for detecting opposing lateral edges 124 and 128 may include scanning each row of the image matrix of the detector 22 and comparing adjacent scanned rows until a substantial variation between the signals read from adjacent rows is detected. Such a substantial variation may be representative of a peripheral edge of the impact region 120. However, it should be understood that the peripheral edges can be detected in other manners using other appropriate techniques and algorithms, as would be appreciated by one of ordinary skill in the art. Once the rows corresponding to the peripheral edges 124 and 128 are determined, a signal may be provided that corresponds to or represents the distance between peripheral edges 124 and 128.

The size of the impact region 120 measured at detector 22 is related to the source-to-image distance 112 according to the following relationship:

$$\frac{X_1}{2} = Y_1 \tan\phi$$

where $X_1$ represents the size of impact region 120, $Y_1$ represents SID 112, and $\phi$ represents the beam angle 118 of x-ray beam 116.

To continue with the installation and calibration procedure, source 12 is then moved to a second source position 130, which corresponds to a second source-to-image distance, referenced generally by the numeral 132. Thus, SID 132 is the distance between detector 22 and focal spot 133 of an x-ray 134 generated by source 12 while at position 130. Further, while source 12 is at source position 130, source position transducer 18 generates a feedback signal, $F_{S2}$, which corresponds to position 130. X-ray beam 134 has a beam angle 136 which is substantially the same as the beam angle 118. That is, the size of the opening 15 of the collimator 14 is substantially the same as it was when the source 12 was at source position 110. Referring to FIG. 4A, x-ray beam 134 impacts detector 22 at an impact region 138, which is defined by peripheral edges 140, 142, 144 and 146. The size of impact region 138 is then determined in the same manner as described above with respect to impact region 138.

The size of impact region 138 measured at detector 22 is related to SID 132 by the following relationship:

$$\frac{X_2}{2} = Y_2 \tan\phi$$

where $X_2$ represents the size of impact region 138, $Y_2$ represents SID 132, and $\phi$ represents the beam angle 136 of x-ray beam 134.

Because the size of beam angle 136 is the same as beam angle 118, the following relationship between the sizes of impact regions 120 and 138, and SID 112 and 132 can be established:

$$\frac{X_1}{X_2} = \frac{Y_1}{Y_2}$$

The physical measurements for $Y_1$ and $Y_2$ are unknown but are related such that:

$$Y_2 = Y_1 + \Delta Y$$

However, $\Delta Y$ can be determined if the x-ray source 12 is displaced by a known distance. For example, the distance between the first source position 110 and the second source position 130 can be physically measured by a field engineer, may be referenced to machined and measured marks on the superstructure supporting source 12, displaced a known distance under control of the system controller 28 and motion control circuitry 24, or derived/calculated from a source position gain constant representing the relationship between source position and position feedback signals that may be obtained during a setup procedure unrelated to the specific determination of the SID. Once the displacement, $\Delta Y$, of source 12 is known, a gain constant for system 10 can be computed:

$$\text{Gain} = \left(\frac{\Delta Y}{F_{S2} - F_{S1}}\right)$$

where $F_{S2}$ represents the electronic feedback signal from the source position transducer 18 when source 12 is at position 130, and $F_{S1}$ represents the electronic feedback signal from source position transducer 18 when source 12 is at position 110.

Further, the actual spatial position for the SIDs corresponding to the first source position 110 and the second source position 130 can be calculated as follows:

$$Y_1 = \frac{\Delta Y\left(\frac{X_1}{X_2}\right)}{\left(1 - \frac{X_1}{X_2}\right)} \quad Y_2 = \frac{\Delta Y\left(\frac{X_2}{X_1}\right)}{\left(1 - \frac{X_2}{X_1}\right)}$$

where $Y_1$ represents the actual spatial measurement for SID 106, and $Y_2$ represents the actual spatial distance corresponding to SID 126.

If desired, the SID computation can be refined by determining additional data points and averaging the results. For example, $Y_1$ and $Y_2$ can be re-calculated for the first and second source positions using different parameters. In an exemplary embodiment, the initial calculations of $Y_1$ and $Y_2$ are performed by determining the size of the impact regions, $X_1$ and $X_2$, of the beams on the detector by finding the distance between the lateral peripheral edges of the respective impact regions, as described above. Second values for $Y_1$ and $Y_2$ can then be recalculated by determining the size of the impact regions, $X_1$ and $X_2$, based on the distance between the longitudinal peripheral edges of the respective impact regions. The initial and second values for $Y_1$ can then be averaged to provide a more accurate computation of the SID at the first source position 110. Similarly, the initial and second values for $Y_2$ can be averaged to provide a more accurate computation of the SID at the second source position 130. Thus, as can be appreciated by those of skill in the art, the computation and averaging of additional data points can contribute to enhanced accuracy of the SID computation.

Having determined the gain constant and $Y_1$, a feedback signal value corresponding to a general SID setpoint can then be determined using the determined gain constant and the empirical data gathered during the calibration of system 10:

$$F = \left(\frac{Y - Y_1}{\text{Gain}}\right) + F_{S1}$$

where F is the computed electronic feedback signal from position sensor 10 for a desired physical SID position Y.

Thus, for example, a user of system 10 may select a desired SID, such as 50 inches, input the desired SID to system controller 28 via operator workstation 32, which then determines the electronic feedback signal that will be generated by source position sensor 18 when source 12 is located at a source position that results in the desired SID. The user of system 10 can then move or command movements of source 12 until the feedback signal from source position sensor 18 corresponds to the computed value for F. In an exemplary embodiment, system 10 provides a visible or audible alarm (e.g., a flashing light, a display on the monitor of the user interface, a beeping sound, etc.) to indicate to the user that source 12 is at a source position corresponding to the selected SID (i.e., when the feedback signal generated by position sensor 18 is substantially equal to the computed value, F, for the selected SID). Alternatively, or in addition to the alarm indication, the system controller 28 can be configured to generate a command signal which causes the motion control circuitry in control circuit 24 to apply a brake that substantially halts further movement of source 12 upon receipt of a feedback signal from position sensor 18 which corresponds to the selected SID.

Figure 5:
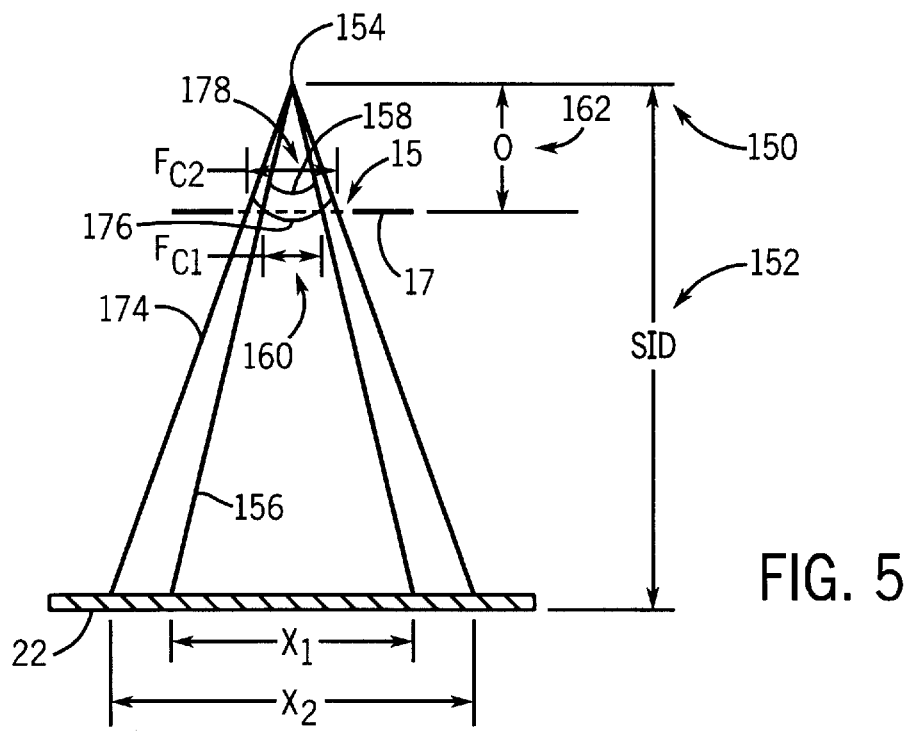
FIG. 5 is another exemplary setup and calibration technique applied to the digital x-ray imaging system of FIG. 1, in which the separation distance between the source and the detector is held constant while the size of the collimator opening is varied such that x-ray beams of two different sizes are generated by the source and detected by the detector.
Figure 5A:
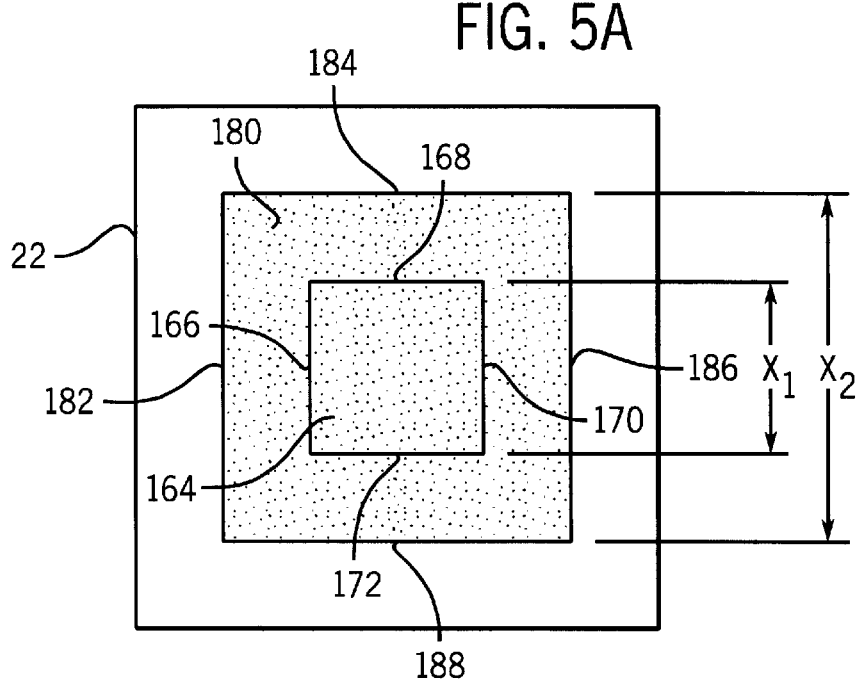
FIG. 5A illustrates the impact regions on the detector of two different x-ray beams, each having a different beam angle, generated while the separation distance between the source and the detector was held constant, as illustrated in FIG. 5.

Turning now to FIGS. 5 and 5A, another exemplary technique for setting up and calibrating SID setpoints for system 10 is illustrated. The technique illustrated in FIGS. 5–5A can be used alone or in conjunction with the technique described above with respect to FIGS. 4 and 4A as will be explained more fully below. Further, although detector 22 is shown in a horizontal position, the exemplary technique applies also to upright detectors.

In the technique illustrated in FIGS. 5–5A, two x-ray beams having two different beam angles are generated by source 12 while the distance between source 12 and detector 22 (i.e., the SID) is held constant. Because the beam angles of the two x-ray beams are different, the respective impact regions of the x-ray beams on detector 22 also are of differing sizes.

As illustrated in FIG. 5, source 12 is positioned at a source position 150, which corresponds to an SID, referenced generally by the numeral 152. SID 152 is the distance between detector 22 and focal spot 154 of an x-ray beam generated by source 12 while at source position 150. While at position 150, source 12 generates a first x-ray beam 156 having a first beam angle 158. The size of beam angle 158 is determined by the size of opening 15 of the collimator assembly 14, which, in turn, is determined by the position of one or more collimator blade sets. In the embodiment illustrated in FIG. 5, the size of opening 15 which is associated with x-ray beam 156 is referenced generally by the numeral 160 and is determined by the position of the first collimator blade set 17. It should be understood, however, that although collimator 14 may include more than one collimator blade set, only the position of first collimator blade set 17 is varied in the technique described with reference to FIGS. 5 and 5A. Thus, in the embodiment illustrated, when the collimator blade set 17 is positioned such that opening 15 corresponds to size 160, collimator position transducer 21 provides an electrical feedback signal, $F_{C1}$, which corresponds to opening size 160.

As further illustrated in FIG. 5, the distance between the focal spot 154 of source 12 and the place in which collimator blade set 17 is disposed is referred to as "O", which is referenced generally by the numeral 162. Parameter 162 is a known and controlled constant which is determined by the physical configuration of source 12 and collimator assembly 14.

X-ray beam 156 impacts detector 122 at an impact region 164, which is illustrated in FIG. 5A. Impact region 164 is defined by peripheral edges 166, 168, 170 and 172. Although impact region 164 is illustrated as having a rectangular or square shape, it should be understood that the peripheral edges 166–172 may be curved such that the periphery of impact region 164 may be circular or otherwise curvilinear. Detector 22 detects the impact of x-ray beam 156 and generates electrical signals representative of the detected beam. Based on these electrical signals, the size of impact region 164 may be determined by detector controller 26 and system controller 28. In an exemplary embodiment, the size of impact region 164 is represented by the distance between opposing lateral peripheral edges 168 and 172. This distance may be determined as described above with respect to FIG. 4A.

Once the size of impact region 164 is determined, the following relationship between the size of the impact region, SID, and the parameters associated with collimator assembly 14 can be established:

$$\frac{Z_1}{O} = \frac{X_1}{Y_1}$$

where $Z_1$ corresponds to size 160 of opening 15, O represents parameter 162 which is the distance between the focal spot 154 and collimator blade set 17, $X_1$ represents the size of impact region 164, and $Y_1$ represents SID) 152. In the exemplary embodiment $Z_1$ is represented by an electrical feedback signal, $F_{C1}$, generated by position transducer 21 when the collimator blade set 17 is in a position in which opening 15 is at size 160. In alternate embodiments, opening size parameter $Z_1$ may be determined in other manners, such as by a physical measurement or with reference to fixed collimator setpoints.

To continue with the installation and calibration procedure, source 12 then generates a second x-ray beam 174 while source 12 is located at source position 150. X-ray beam 174 has a beam angle 176 which is different than beam angle 158 of x-ray beam 156. The change in the beam angles is accomplished by changing the size of opening 15 of collimator assembly 14, such as by changing the position of the collimator blade set 17. In the embodiment illustrated in FIG. 5, the size of opening 15 is increased to a size represented generally by the numeral 178. When opening 15 is at size 178, position transducer 21 provides an electronic feedback signal, $F_{C2}$, which is representative of the position of the collimator blade set 17 (i.e., the size of opening 15).

Turning now to FIG. 5A, x-ray beam 174 impacts detector 22 at an impact region 180. Impact region 180 is defined by peripheral edges 182, 184, 186, and 188. Again, although impact region 180 is illustrated as having a rectangular shape, it should be understood that the peripheral shape of impact region 180 may be circular or otherwise curvilinear. The size of impact region 180 is then determined in the same manner as described above with respect to impact region 164.

The size of impact region 180 is related to the collimator parameters and SID by the following relationship:

$$\frac{Z_2}{O} = \frac{X_2}{Y_1}$$

where $Z_2$ represents the size 178 of collimator opening 15. As discussed above, $Z_2$ may be represented by the electrical feedback signal, $F_{C2}$, generated by position transducer 21 when opening 15 of collimator 14 is at size 178.

Solving for $Y_1$, or SID, in both equations set forth above leads to the following relationship:

$$\left(\frac{X_1}{Z_1}\right)O = \left(\frac{X_2}{Z_2}\right)O$$

such that:

$$Z_2 = \left(\frac{X_2}{X_1}\right)Z_1$$

which can be expressed in terms of a single variable:

$$Z_2 = Z_1 + \Delta Z$$

to yield:

$$Z_1 = \frac{\Delta Z}{\left(\frac{X_2}{X_1}\right) - 1}$$

An actual calibrated spatial position for $Y_1$ (i.e. SID) can then be determined as follows:

$$Y_1 = \left(\frac{X_1}{Z_1}\right)O = \left[\frac{X_1}{\frac{\Delta Z}{\left(\frac{X_2}{X_1}\right) - 1}}\right]O$$

If desired, the SID computation can be refined by determining additional data points and averaging the results. For example, $Y_1$ can be re-calculated for the first source position using different parameters. In an exemplary embodiment, $Y_1$ is first calculated by determining the sizes, $X_1$ and $X_2$, of the impact regions based on the distance between the lateral peripheral edges of the respective impact regions. $Y_1$ may then be re-calculated by determining the sizes, $X_1$ and $X_2$, of the impact regions based on a different parameter, such as the distance between the longitudinal peripheral edges of the respective impact regions. The initial and re-calculated values for $Y_1$ can then be mathematically averaged to obtain an average $Y_{1\,AVG}$ which more accurately represents the SID at the first source position. To further enhance the accuracy of the SID computation, additional values for $Y_1$ can be determined at the first source position, such as by performing additional exposures. These additional values may then be mathematically averaged to obtain a more accurate value for $Y_{1\ AVG}$.

Having determined a value for $Y_1$ that represents the SID at the first source position 150, source 12 can be moved to a second source position such that an SID gain constant for system 10 can be determined. That is, the technique described with reference to FIGS. 5 and 5A for determining a calibrated readout representative of SID can be repeated at a second source position to obtain a value for $Y_2$ which corresponds to the second SID. The separation gain constant can be determined based on the calculated values for $Y_1$ and $Y_2$ and the feedback signals generated by source position transducer 18 at the first and second source positions. After the separation gain constant is determined, SID setpoints can be found for any SID value selected by a user of system 10. Thus, to find an SID setpoint, the value of the feedback signal generated by position transducer 18, which corresponds to the selected SID, first is calculated. Source 12 then can be positioned at the selected SID by moving source 12 until a feedback signal is received which corresponds to the calculated value. Further, a calibrated readout of the spatial value of the selected SID can be provided to the user.

Figure 6:
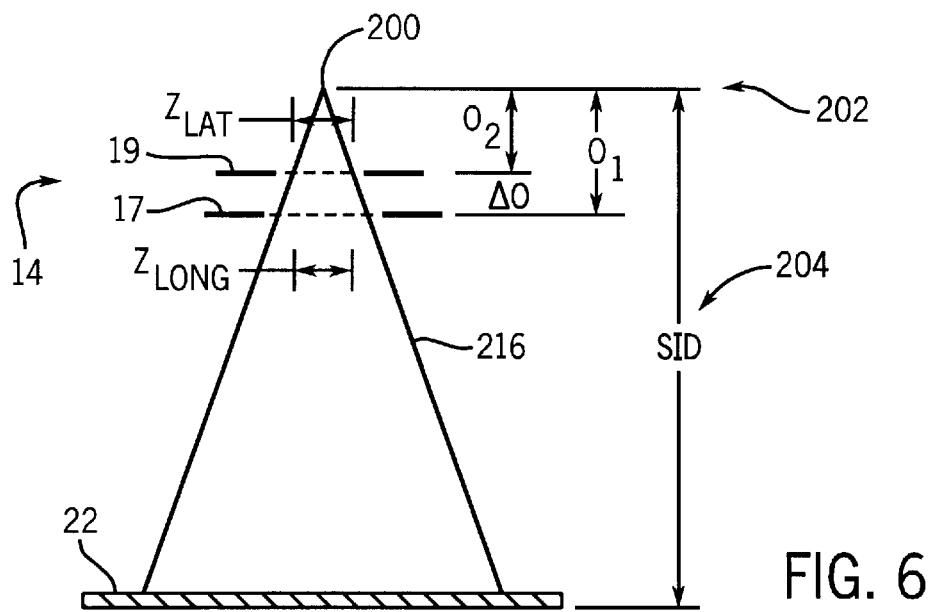
FIG. 6 illustrates another exemplary setup and calibration technique for the digital x-ray imaging system of FIG. 1, in which the separation distance between the source and the detector is held constant while the position of each of two different sets of collimator blades is varied.

Turning now to FIG. 6, another technique for determining SID is illustrated which also can be used alone or in conjunction with the technique described above with respect to FIGS. 4 and 4A. It should be understood that, although detector 22 is shown in a horizontal position, the technique may also be applied to a detector in any orientation.

In the technique illustrated in FIG. 6, collimator assembly 14 includes two sets of collimator blades 17 and 19 which are used in combination to establish the size of collimator opening 15 in the lateral and longitudinal directions, respectively. The plane in which collimator blade set 17 is disposed is at a fixed distance $O_1$ from a known focal point 200 of source 12. Similarly, the plane in which collimator blade set 19 is disposed is at a distance $O_2$ from focal point 200. In an exemplary embodiment, individual distances $O_1$ and $O_2$ are not known parameters. Rather, the distance, $\Delta O$, between the planes in which blade sets 17 and 19 are disposed is a known constant that is provided to the system controller 28. In alternative embodiments, $O_1$ and $O_2$ may be known and provided to the system controller 28, which may then determine $\Delta O$ by calculating the difference between $O_1$ and $O_2$.

In the embodiment illustrated in FIG. 6, SID is determined by positioning source 12 at a first source location 202 which corresponds to a SID 204, and generating a minimum of two x-ray beams while varying the size of collimator opening 15. At source location 202, the size of the x-ray beam projected onto detector 22 is related to the size of collimator opening 15 and the distance, $\Delta O$, between the two planes in which blade sets 17 and 19 are disposed. This relationship can be expressed as follows:

$$\frac{X_{LAT}}{Z_{LAT}} = \frac{Y}{O_1}$$

where $X_{LAT}$ represents the size of the impact region on detector 22 associated with the position of collimator blade set 17; $Z_{LAT}$ represents the size of the opening of collimator blade set 17; $O_1$ represents the distance between focal point 200 and the plane in which blade set 17 is disposed; and Y represents SID 204.

Similarly, the following relationship can be expressed:

$$\frac{X_{LONG}}{Z_{LONG}} = \frac{Y}{O_2}$$

where $X_{LONG}$ represents the size of the impact region on detector 22 associated with the position of collimator blade set 19; $Z_{LONG}$ represents the size of the opening of collimator blade set 19; and $O_2$ represents the distance between focal point 200 and the plane in which blade set 19 is disposed.

Figure 6A:
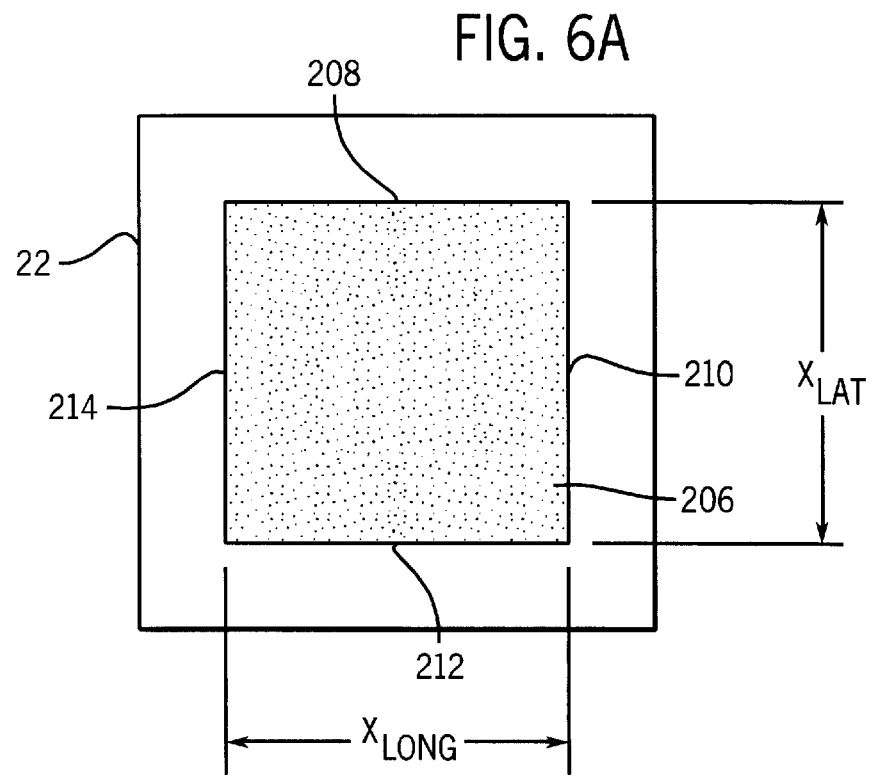
FIG. 6A illustrates an exemplary impact region on the detector from an x-ray beam generated using the technique of FIG. 6.

An exemplary illustration of the parameters $X_{LAT}$ and $X_{LONG}$ is provided in FIG. 6A in which an exemplary impact region 206 on detector 22 is defined by peripheral edges 208, 210, 212, and 214. In the illustrated embodiment, parameter $X_{LAT}$ corresponds to the distance between opposing lateral edges 208 and 212. Similarly, the parameter $X_{LONG}$ corresponds to the distance between opposing longitudinal edges 210 and 214. It should be understood, however, that impact region 206 may have various sizes and shapes and, thus, that $X_{LAT}$ and $X_{LONG}$ may correspond to other dimensions which are related to the size of region 206.

Returning to FIG. 6, to determine SID, the openings of collimator blade sets 17 and 19 are set to an arbitrary controlled initial position while the source is at source location 202. Source 12 generates an x-ray beam 216, which impacts upon and is detected by detector 22. In the exemplary embodiment, the size of the impact region is determined by detecting both the lateral and longitudinal edges of the impact region and calculating the respective distances therebetween, as described above with respect to FIGS. 4A and 5A. The distance between the lateral edges of the impact region corresponds to the parameter $X_{LAT,1}$, where "1" indicates the first exposure. Likewise, the distance between the longitudinal edges of the impact region corresponds to the parameter $X_{LONG,1}$, where "1" again indicates the first exposure.

Next, while source 12 is still positioned at source location 202, both collimator blade sets 17 and 19 are displaced known and controlled amounts, $\Delta Z$. A second x-ray beam is then generated, which impacts upon and is detected by detector 22. Again, the size of the impact region on detector 22 is determined by detecting both the lateral and longitudinal regions and calculating the respective distances therebetween. The distance between the lateral edges corresponds to the parameter $X_{LAT,2}$, and the distance between the longitudinal edges corresponds to the parameter $X_{LONG,2}$.

Additional x-ray exposures may be performed with the source 12 located at position 202. For each subsequent exposure, the collimator blade sets 17 and 19 are displaced known and controlled amounts, $\Delta Z$, and the sizes of the impact regions (i.e., $X_{LAT,\,j}$ and $X_{LONG,\,j}$, where j=1,2, . . . n discrete exposures) of the x-ray beams on detector 22 are determined.

Figure 7:
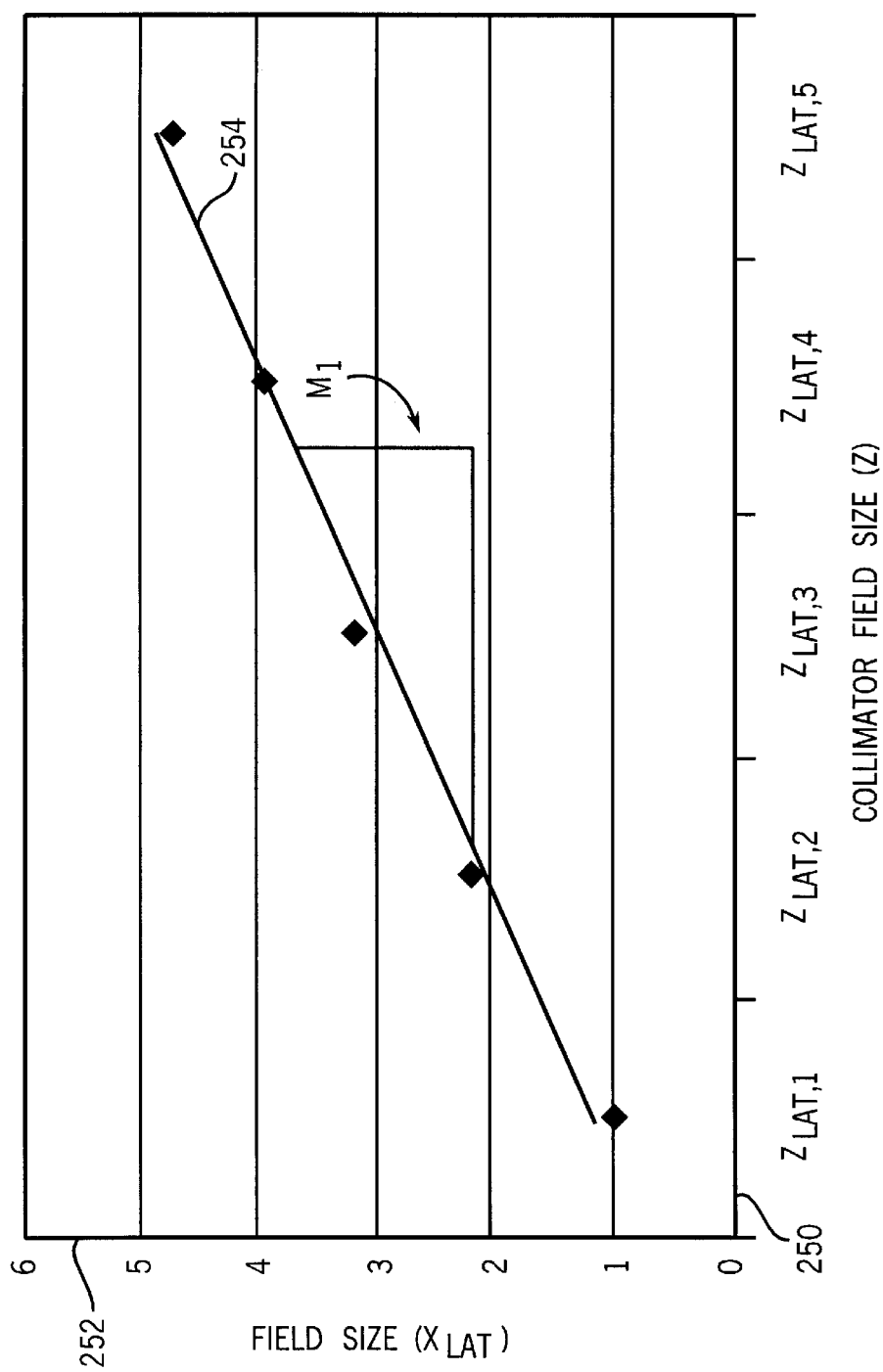
FIG. 7 illustrates an exemplary graph of data points determined using the technique shown in FIG. 6.

Exemplary data points determined for first blade set 17 may be plotted in a graph, such as the graph illustrated in FIG. 7, in which the horizontal axis 250 corresponds to the position, or opening size, of first collimator blade set 17, and the vertical axis 252 corresponds to the determined impact region size $X_{LAT,j}$. A similar graph of data points may be plotted for second blade set 19. The data points for each blade set may then be mathematically averaged and a calibration line 254 for each set of data points may be determined. Thus, it can be seen that only a minimum of two data points (i.e., two x-ray exposures) are needed to construct calibration line 254. However, additional data points can improve the accuracy of the final SID computation.

Further, it can be seen that if the collimator blades are displaced by a known and controlled amount, $\Delta Z$, then the actual positions of blade sets 17 and 19, which correspond to $Z_{LAT, j}$ and $Z_{LONG, j}$, need not be known or provided to system controller 28 (e.g., by one or more position transducers 21). Rather, the slope, $M_j$, of the calibration line (where i=1 indicates the slope of the calibration line associated with first blade set 17, and i=2 indicates the slope of the calibration line associated with second blade set 19) can be determined by known mathematical techniques such that the following relationships can be derived:

$$\frac{X_{LAT}}{Z_{LAT}} = M_1 = \frac{Y}{O_1} \qquad \frac{X_{LONG}}{Z_{LONG}} = M_2 = \frac{Y}{O_2}$$

and $$Y = M_1 O_1 = M_2 O_2$$

As set forth above, collimator 14 is designed and constructed to specific and consistent dimensional tolerances, such that the spatial relationship between first and second blade sets 17 and 19 is known. This relationship can be expressed as follows:

$$O_1 = O_2 + \Delta O$$

where $\Delta O$ is a known constant that has been provided to system controller 28 for use during the setup and installation procedure.

The following equation may then be derived:

$$M_2 O_2 = M_1 (O_2 + \Delta O)$$

which allows O2 to be expressed as follows:

$$O_2 = \frac{M_1 \Delta O}{M_2 - M_1}$$

which can then be related to SID 204 as follows:

$$SID = M_2 O_2 = \frac{M_2 M_1 \Delta O}{M_2 - M_1}$$

where Y corresponds to SID 204.

Once SID has been determined, indicia representative of the value of SID can be displayed to a user of system 10 via user interface 32. Further, a separation gain constant, which can be used to determine SID setpoints for system 10, can be determined by moving source 12 to a second source location and repeating the technique described above with respect to FIGS. 6, 6A, and 7 to yield a value for SID at the second source location. As described above with respect to FIGS. 4 and 4A, the determined SID at the first source location and the determined SID at the second source location may be used in conjunction with feedback signals from a source position transducer (i.e., transducer 18) to determine a separation gain constant.

For the methodologies described above, it has been understood that a field engineer is present at the location of system 10 to perform the setup and calibration procedure, including the determination of a calibrated SID readout and SID setpoints. However, it is contemplated that the installation and calibration procedure can be performed from a location that is remote from source 12 and detector 22. For example, the procedure can be initiated and controlled from a user interface or operator workstation, such as an operator workstation 32, that is in communication with system controller 28 via a network, such as the Internet, a local area network, or a wide area network, etc. Additionally or alternatively, all or portions of system controller 28, or other processing modules that execute all or part of the setup and calibration procedure, may be remotely located and configured to communicate with the other elements of system 10 via an appropriate communication interface. Further, it should be understood that source 12 and/or detector 22 can be positioned either manually or with the aid of motion control or motorized elements.

Still further, it should be understood that the gain relationships, SID setpoints, and SID calculations described above have been determined by performing at least one x-ray exposure at each of two source locations or a minimum of two exposures at one source location. It should be understood, however, that the described technique can provide more accurate results by performing additional x-ray exposures at each source location, calculating the corresponding data points, and averaging the results. Still further, additional exposures can be performed at additional source locations and the results can be averaged to enhance accuracy. Moreover, it is contemplated that gain constants and the SID can be determined using other appropriate equations rather than the specific equations set forth above. Such other equations may also have a form other than the linear forms described above, such as a polynomial form, which may contribute to enhanced accuracy of the computed results.

Further, the setup procedure has been described for a digital radiographic imaging system which includes a digital x-ray detector. It should be understood, however, that the setup procedure may be implemented in any digital imaging system having other types digital detectors, such as a detector based on charge coupled device technology. Further, the radiation source in the imaging system need not be an x-ray source, but can generate any type of radiation that is useful in the imaging system and that can be detected by the system's detector.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for determining a separation distance between a radiation source and a digital detector, the radiation source having a collimator opening through which a radiation beam generated by the source is directed, the method comprising the steps of:

detecting a first impact region on the digital detector of a first radiation beam generated by the radiation source while at a first source position;

determining a first size of the first impact region;

varying a size of the collimator opening;

detecting a second impact region on the digital detector of a second radiation beam generated by the radiation source while at the first source position, the second radiation beam being directed through the varied size of the collimator opening such that the second impact region has a second size different than the first size;

determining the second size; and determining a first separation distance between the radiation source and the digital detector based on the variation of the size of the collimator opening and the determined first and second sizes of the first and second impact regions.

2. The method as recited in claim 1, wherein the size of the collimator opening is controlled by at least a first collimator blade set, and wherein varying the size of the collimator opening comprises changing a position of the first collimator blade set.

3. The method as recited in claim 2, wherein the radiation source has a focal point, wherein the first collimator blade set is disposed in a plane separated from the focal point by a first collimator distance, O1, and wherein determining the first separation distance is based on the first collimator distance O1.

4. The method as recited in claim 1, wherein the first and second impact regions each are defined by respective peripheral edges, and wherein determining the first and second sizes each comprises the steps of:
    detecting a first pair of opposing peripheral edges; and
    determining a first edge distance between the first pair of opposing peripheral edges.

5. The method as recited in claim 4, wherein the digital detector comprises a plurality of rows and a plurality of columns defining an image matrix, and wherein detecting the respective pairs of opposing peripheral edges comprises determining a first row and a second row corresponding to each peripheral edge of each respective first pair of opposing peripheral edges.

6. The method as recited in claim 4, wherein determining the first separation distance comprises the steps of:
    determining a first value of the first separation distance based on the first edge distance between each of the respective first pairs of opposing peripheral edges defining the first impact region and the second impact region;
    detecting a second pair of opposing peripheral edges defining each of the first and the second impact regions;
    determining a second edge distance between each of the respective second pairs of opposing peripheral edges;
    determining a second value of the first separation distance between the radiation source and the digital detector based on the variation of the size of the collimator opening and the determined second edge distances of the first and second impact regions; and
    mathematically averaging the first value and the second value.

7. The method as recited in claim 1, further comprising the steps of:
    positioning the radiation source at a second source position;
    detecting a third impact region on the digital detector of a third radiation beam generated by the radiation source while at the second source position and while the collimator opening is of a given size;
    determining a third size of the third impact region;
    varying the given size of the collimator opening;
    detecting a fourth impact region on the digital detector of a fourth radiation beam generated by the radiation source while at the second source position, the fourth radiation beam being directed through the varied given size of the collimator opening such that the fourth impact region has a fourth size different than the third size;
    determining the fourth size;
    determining a second separation distance based on the variation of the given size of the collimator opening and the determined third and fourth sizes of the third and fourth impact regions;
    determining a separation gain constant based on a relationship between the first and second separation distances and the first and second source positions; and
    utilizing the separation gain constant to position the radiation source at any selected separation distance.

8. The method as recited in claim 1, wherein the size of the collimator opening is controlled by a first collimator blade set and a second collimator blade set, and varying the size of the collimator opening comprises changing a position of the first collimator blade set and changing a position of the second collimator blade set.

9. The method as recited in claim 8, wherein the first and second impact regions each are defined by opposing lateral peripheral edges and opposing longitudinal peripheral edges, and wherein determining the respective first and second sizes of the first and second impact regions comprises the steps of:
    determining a lateral distance between the opposing lateral peripheral edges, the lateral distance being dependent upon the position of the first collimator blade set; and
    determining a longitudinal distance between the opposing longitudinal peripheral edges, the longitudinal distance being dependent upon the position of the second collimator blade set.

10. The method as recited in claim 1, wherein determining the first separation distance comprises identifying a calibration relationship between the size of the collimator opening and the first and second sizes of the first and second impact regions.

11. The method as recited in claim 10, wherein the calibration relationship is a linear relationship.

12. The method as recited in claim 8, wherein determining the first separation distance comprises the steps of:
    identifying a first calibration relationship between the position of the first collimator blade set and the first and second sizes of the first and second impact regions; and
    identifying a second calibration relationship between the position of the second collimator blade set and the first and second sizes of the first and second impact regions.

13. The method as recited in claim 6, comprising the step of:
    initiating a step of the method from a remote location.

14. A digital imaging system, comprising:
    a digital detector configured to detect radiation beams;
    a radiation source having a collimator, the collimator having a collimator opening through which a radiation beam generated by the radiation source is directed, the radiation source being configured to generate a first radiation beam detectable by the digital detector while the radiation source is at a first source position relative to the digital detector and while the collimator opening is at a first size, the radiation source being further configured to generate a second radiation beam detectable by the digital detector while the radiation source is at the first source position and while the collimator opening is at a second size; and
    a processing module configured to:
        determine a first size of a first impact region of the first radiation beam detected by the digital detector;

A determine a second size of a second impact region of the second radiation beam detected by the digital detector; and determine a first separation distance corresponding to the first source position relative to the digital detector based on the first and second sizes of the first and second impact regions and the first and second sizes of the collimator opening.

15. The system as recited in claim 14, wherein the first and second impact regions each are defined by respective peripheral edges, and the processing module is configured to:

detect a first pair of opposing peripheral edges of the first impact region and determine a first edge distance therebetween, the first edge distance corresponding to the first size of the first impact region; and detect a first pair of opposing peripheral edges of the second impact region and determine a second edge distance therebetween, the second edge distance corresponding to the second size of the second impact region.

16. The system as recited in claim 15, wherein the digital detector comprises a plurality of rows and a plurality of columns defining an image matrix, and the first size of the first impact region is determined by detecting a pair of rows which correspond to the first pair of opposing peripheral edges of the first impact region, and the second size of the second impact region is determined by detecting a pair of rows which correspond to the first pair of opposing peripheral edges of the second impact region.

17. The system as recited in claim 15, wherein the processing module is configured to:

detect a second pair of opposing peripheral edges of the first impact region and determine a second edge distance therebetween;

detect a second pair of opposing peripheral edges of the second impact region and determine a second edge distance therebetween;

determine a first value of the first separation distance based on the respective first edge distances of the first and second impact regions and the first and second sizes of the collimator opening;

determine a second value of the first separation distance based on the respective second edge distances of the first and second impact regions and the first and second sizes of the collimator opening; and mathematically average the first and second value of the first separation distance.

18. The system as recited in claim 14, wherein the processing module is configured to determine a calibration relationship between the first and second sizes of the collimator opening and the first and second sizes of the first and second impact regions and to determine the separation distance based on the calibration relationship.

19. The system as recited in claim 18, wherein the calibration relationship is a linear relationship.

20. The system as recited in claim 14, wherein the collimator includes a first collimator blade set to control a first dimension of the size of the collimator opening and a second collimator blade set to control a second dimension of the size of the collimator opening, wherein, when the collimator opening is at the first size, the first and the second collimator blade sets each are at respective first positions, and, when the collimator opening is at the second size, the first and the second collimator blade sets each are at respective second positions, wherein the respective second positions are different than the respective first positions.

21. The system as recited in claim 20, wherein the first and second impact regions each are defined by a pair of opposing lateral edges and a pair of opposing longitudinal edges, and the processing module is configured to:

determine a first lateral distance between the pair of opposing lateral edges of the first impact region;

determine a first longitudinal distance between the pair of opposing longitudinal edges of the first impact region;

determine a second lateral distance between the pair of opposing lateral edges of the second impact region;

determine a second longitudinal distance between the pair of opposing longitudinal edges of the second impact region;

determine a first calibration relationship between the first and second lateral distances and the first and second positions of the first collimator blade set;

determine a second calibration relationship between the first and second longitudinal distances and the first and second positions of the second collimator blade set; and determine the first separation distance based on the first and second calibration relationships.

22. The system as recited in claim 14, comprising a position transducer in communication with the processing module, the position transducer being configured to generate a feedback signal representative of size of the collimator opening, wherein the processing module utilizes the feedback signal to determine the first separation distance.

23. The system as recited in claim 14, comprising a user interface in communication with the processing module, the user interface being configured to display indicia representative of the determined first separation distance.

24. The system as recited in claim 21, wherein the user interface is disposed at a location remote from the radiation source and the digital detector.

25. The system as recited in claim 14, wherein the processing module is disposed at a location remote from the radiation source and the digital detector.

26. A digital imaging system including a radiation source configured to generate radiation beams detectable by a digital detector, the radiation source having a collimator opening through which the radiation beams are directed, the system comprising:

means for detecting a first impact region on the digital detector of a first radiation beam generated while the radiation source is at a first source position;

means for determining a first size of the first impact region;

means for varying a size of the collimator opening;

means for detecting a second impact region on the digital detector of a second radiation beam generated by the radiation source while at the first source position, the second radiation beam being directed through the varied size of the collimator opening such that the second impact region has a second size different than the first size of the first impact region;

means for determining the second size;

means for determining the first source position of the radiation source relative to the digital detector based on the variation of the size of the collimator opening and the first and second sizes of the first and second impact regions.

27. A radiographic imaging system, comprising:

a radiation source to generate radiation beams, the radiation source including a collimator having a collimator opening through which the radiation beams are directed;

a digital detector to detect the radiation beams;

a processing module to determine a source setpoint position corresponding to a separation distance of the radiation source from the digital detector, the processing module being configured to determine the source setpoint position based on a separation gain constant, the separation gain constant having been determined by:

determining a first size of a first impact region on the digital detector, the first impact region corresponding to a first radiation beam generated by the radiation source while at a first source position and while the collimator opening is at a first opening size;

determining a second size of a second impact region on the digital detector, the second impact region corresponding to a second radiation beam generated by the radiation source while at the first source position and while the collimator opening is at a second opening size different than the first opening size;

determining a third size of a third impact region on the digital detector, the third impact region corresponding to a third radiation beam generated by the radiation source while at a second source position different than the first source position and while the collimator opening is at a third collimator size;

determining a fourth size of a fourth impact region on the digital detector, the fourth impact region corresponding to a fourth radiation beam generated by the radiation source while at the second source position and while the collimator opening is at a fourth collimator size different than the third collimator size; and identifying a calibration relationship between the determined first, second, third, and fourth sizes of the impact regions, the first and second source positions, and the first, second, third, and fourth collimator sizes.

28. The system as recited in claim 27, wherein the first collimator size is different than the third collimator size.

29. The system as recited in claim 27, wherein the first, second, third, and fourth impact regions each are defined by respective peripheral edges, and wherein determining the respective size of each of the impact regions comprises:

detecting a pair of opposing peripheral edges; and determining an edge distance between the detected pair of opposing peripheral edges.

30. The system as recited in claim 27, comprising a user interface in communication with the processing module, the user interface being configured to display indicia representative of the separation distance when the source is positioned at the source setpoint position.

31. The system as recited in claim 27, wherein the separation distance is selected by a user via the user interface.

32. The system as recited in claim 31, wherein the user interface is at a location remote from the radiation source and the digital detector.

33. The system as recited in claim 27, wherein the processing module is at a location remote from the radiation source and the digital detector.

34. The system as recited in claim 27, comprising a source position transducer to sense source positions and generate feedback signals representative of the sensed source positions, wherein a first feedback signal representative of the first source position and a second feedback representative of the second source position are utilized in the identification of the calibration relationship.

* * * * *